United States Patent
Gupta et al.

(10) Patent No.: US 8,446,743 B2
(45) Date of Patent: May 21, 2013

(54) SOFT SWITCHING POWER ELECTRONIC TRANSFORMER

(75) Inventors: Ranjan Kumar Gupta, Minneapolis, MN (US); Krushna Keshab Mohapatra, Minneapolis, MN (US); Ned Mohan, St. Paul, MN (US); Gysler Castelino, St. Paul, MN (US); Kaushik Basu, St. Paul, MN (US); Nathan Weise, Minneapolis, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 298 days.

(21) Appl. No.: 12/834,437

(22) Filed: Jul. 12, 2010

(65) Prior Publication Data

US 2011/0007534 A1 Jan. 13, 2011

Related U.S. Application Data

(60) Provisional application No. 61/224,790, filed on Jul. 10, 2009.

(51) Int. Cl.
*H02M 3/335* (2006.01)
*H02M 7/44* (2006.01)

(52) U.S. Cl.
USPC ............ 363/17; 363/34; 363/37; 363/95; 363/98; 363/131; 363/132

(58) Field of Classification Search
USPC .............. 363/17, 34, 37, 95, 98, 131, 132
See application file for complete search history.

(56) References Cited

U.S. PATENT DOCUMENTS

| | | | | |
|---|---|---|---|---|
| 5,172,309 | A * | 12/1992 | DeDoncker et al. | 363/132 |
| 5,742,495 | A * | 4/1998 | Barone | 363/65 |
| 5,875,103 | A * | 2/1999 | Bhagwat et al. | 363/17 |
| 5,946,200 | A * | 8/1999 | Kim et al. | 363/17 |
| 6,272,023 | B1 * | 8/2001 | Wittenbreder | 363/16 |
| 6,411,527 | B1 * | 6/2002 | Reinold | 363/17 |
| 6,452,289 | B1 * | 9/2002 | Lansberry et al. | 307/25 |
| 6,504,267 | B1 * | 1/2003 | Giannopoulos | 307/31 |
| 6,583,994 | B2 * | 6/2003 | Clayton et al. | 363/21.18 |
| 6,954,367 | B2 * | 10/2005 | Yang et al. | 363/98 |
| 7,157,886 | B2 * | 1/2007 | Agarwal et al. | 323/207 |
| 7,667,986 | B2 * | 2/2010 | Artusi et al. | 363/16 |
| 7,675,758 | B2 * | 3/2010 | Artusi et al. | 363/21.01 |
| 7,675,759 | B2 * | 3/2010 | Artusi et al. | 363/21.01 |
| 2004/0125618 | A1 * | 7/2004 | De Rooij et al. | 363/17 |
| 2004/0136208 | A1 * | 7/2004 | Agarwal et al. | 363/21.12 |
| 2007/0230222 | A1 * | 10/2007 | Drabing et al. | 363/21.01 |

* cited by examiner

*Primary Examiner* — Bao Q Vu
(74) *Attorney, Agent, or Firm* — Schwegman, Lundberg & Woessner, P.A.

(57) ABSTRACT

This patent document discloses power electronic transformers having a high-frequency link. An example apparatus include a transformer having a primary winding and a secondary winding, the transformer is configured to receive a primary power signal having a first frequency, a primary converter configured to selectively oscillate polarity of the primary windings with respect to the secondary windings at a second frequency, the second frequency substantially substantially higher than the first frequency, a secondary converter coupled to the secondary winding, the secondary converter configured to provide a load power signal using a high frequency power signal generated using the secondary winding. The secondary converter can be configured to reduce current flow in the primary winding when the polarity of the primary winding is switched, the reduced current follow is configured to reduce disturbances resulting from leakage inductance of the transformer.

11 Claims, 12 Drawing Sheets

US 8,446,743 B2

SOFT SWITCHING POWER ELECTRONIC TRANSFORMER

PRIORITY AND RELATED APPLICATIONS

This document claims the benefit under 35 U.S.C. Section 119(e), to U.S. Provisional Patent Application Ser. No. 61/224,790, filed on Jul. 10, 2009, and is incorporated herein by reference in its entirety.

STATEMENT REGARDING FEDERALLY SPONSORED RESEARCH OR DEVELOPMENT UNDER 37 C.F.R. 401.14(a)(f)(4)

This invention was made with government support under N00014-07-1-0463 and N00014-07-1-0968 awarded by the Office of Naval Research (ONR). The government has certain rights in the invention.

TECHNICAL FIELD

This patent document pertains generally to electronic transformers. More particularly, but not by way of limitation, this patent document pertains to methods and apparatus for power electronic transformers including a high-frequency AC-AC link for both AC and DC power conversion.

BACKGROUND

A transformer can be used to change and transmit electric power from one voltage level to another voltage level. It can also maintain isolation between two voltage level circuitry. Typically, the transformer is one of the heaviest, bulkiest and most expensive parts in a transmission and distribution system. The large size of the transformer is due, in part, to the low frequency of operation. Power density increases as the operating frequency of the transformer increases, resulting in a smaller transformer size and weight. To change operating frequency from a Hz level to a kHz level, power electronics can be used. Power electronics in combination with reduced sized, high-frequency transformers is known as power electronic transformers.

OVERVIEW

The present inventors have recognized an opportunity to replace the bulky, expensive, low frequency transformer with a high-frequency power electronic transformer having a low number of semiconductor switches and/or no DC link. In the disclosed topologies, alternate sets of mutually coupled primary windings can be switched mutually exclusively, with reduced switch requirements. Additionally, no DC link need be included. Other features of the disclosed topologies include one or more of: three-phase high-frequency transformer with multiple windings; mutually exclusive switching of coupled-primary windings to generate high-frequency waveform; and direct AC-AC power conversion with no intermediate stage or storage or virtual DC link.

Advantageously, the disclosed power electronic transformers provide high-frequency AC-AC power conversion, allowing for reduction in size and weight relative to conventional transformers, electronic tap changing or controllable input power factor.

These and other embodiments, advantages, and aspects of the present power electronic transformers will be set forth in part in following Detailed Description. This Overview is intended to provide some examples of the subject matter of the present patent application. It is not intended to provide an exclusive or exhaustive explanation of the present invention. The Detailed Description is included to provide further information about the present patent application.

BRIEF DESCRIPTION OF THE DRAWINGS

In the drawings, like numerals can be used to describe similar components throughout the several views. Like numerals having different letter suffixes can be used to represent different instances of similar components. The drawings illustrate generally, by way of example, but not by way of limitation, various embodiments discussed in the present document.

DETAILED DESCRIPTION

In this patent document, power electronic transformer topologies and control strategies are described. It has been found that by using power electronic transformers (PETs), dramatic reductions in size and/or weight can be achieved. For example, a power electronic transformer having a rating of 140 kV, 20 kHz and 20 A can weigh about 450 lbs. In contrast, a conventional transformer having a rating of 100 kV, 60 Hz and 20 A can weigh about 35 tons. A high-frequency waveform at the primary windings (three windings) can be generated using H-Bridge topology (three H-bridges).

In various embodiments, the topologies and control strategies use a single high frequency link that allows bi-directional power flow, adjustable frequency and voltage magnitude regeneration, input power factor correction, electrical isolation, high voltage transfer, and high power density resulting in reduced transformer size. In various embodiments, control strategy methods associated with the various PET topologies allow elimination of clamp circuits on the primary, the secondary or both the primary and secondary sides of the PET. Various control methods discussed also reduce or substantially eliminate disturbances associated with leakage inductance, and reduce or substantially eliminate switching losses associated with various PET topologies. These topologies also provide single-stage power conversion eliminating DC coupling and DC devices including high voltage DC capacitors that can be unreliable.

Figure 1:
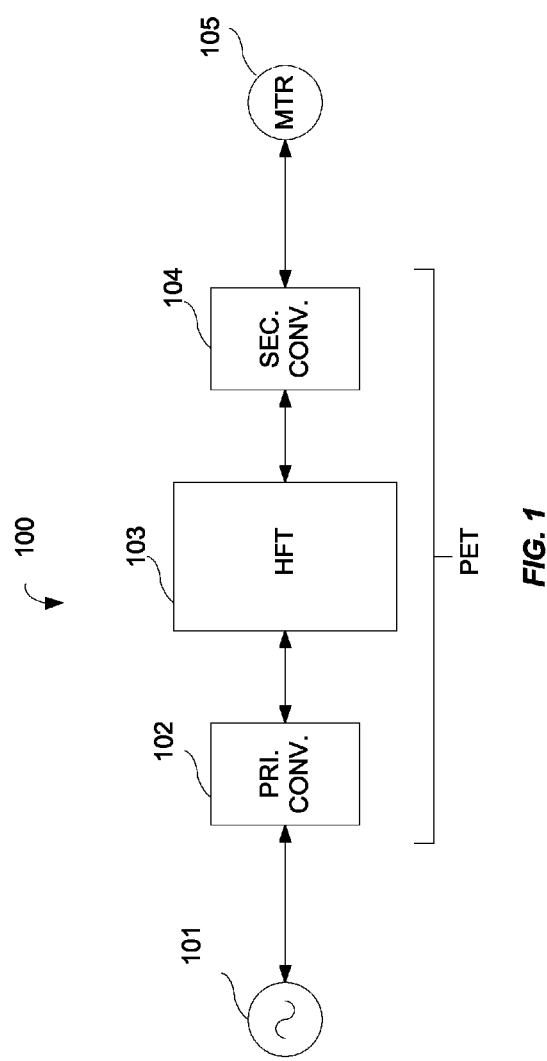
FIG. 1 shows power electronic transformer in a power transfer system according to one embodiment of the present subject matter.

FIG. 1 shows power electronic transformer in a power transfer system according to one embodiment of the present subject matter. The system 100 includes a first power source 101, a primary converter 102, a high frequency transformer 103, a secondary converter 104, and a remote device 105. In various embodiments, the first power source 101 is an electrical utility grid system, or at least a portion of such a system. The remote device 105 can be an energy-consuming device such as a motor, or a electric or hybrid vehicle receiving a charge. In some embodiments, the remote device 105 is a second power source such as a wind turbine generator, photovoltaic cell, or a power storage device such as a battery or a capacitor. In some embodiments, the remote device 105 can consume energy and source energy. It is understood that in various embodiments, the remote device can include other energy consuming devices and power source devices without departing from the scope of the present subject matter including, but not limited to, single-phase devices, 3-phase devices and DC devices.

Figure 2:
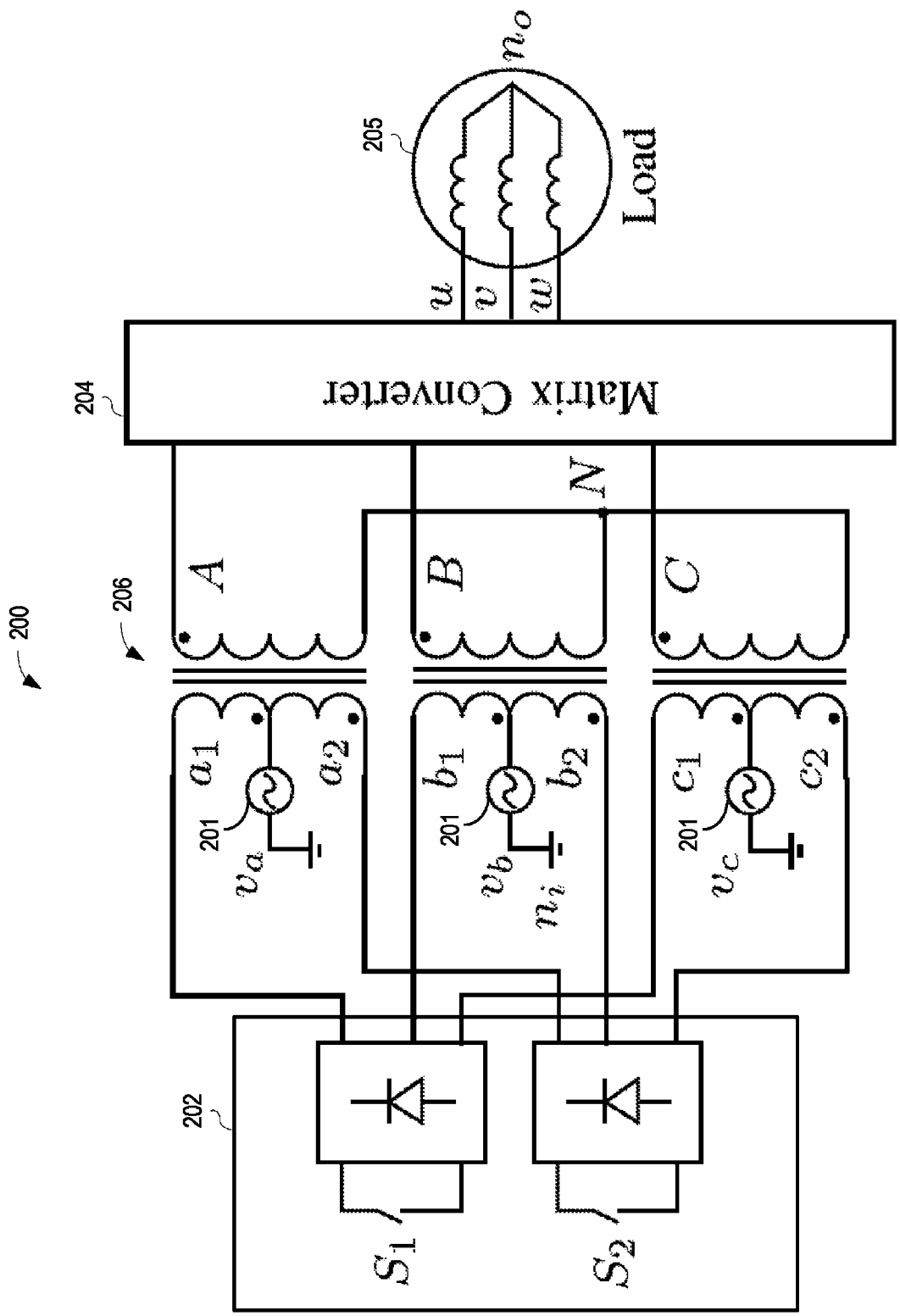
FIG. 2 shows a three-phase (3Ø) push-pull topology 200 for a power electronic transformer (PET) according to one embodiment of the present subject matter.

FIG. 2 shows a three-phase (3Ø) push-pull topology 200 for a power electronic transformer (PET) according to one embodiment of the present subject matter. The PET includes a high frequency transformer (HFT) 206 with a set of primary windings, $a_1, a_2, b_1, b_2, c_1, c_2$, coupled to legs of a three-phase device through a primary converter 202 including two switches $S_1, S_2$. The HFT 206, as also includes a core and a set of secondary windings A, B, C. The secondary windings couple to a matrix converter 204. The PET receives a 3Ø low frequency power signal at the primary windings $a_1, a_2, b_1, b_2, c_1, c_2$, and uses the two switches $S_1, S_2$, of the primary converter 202 to produce a high frequency waveform on the primary windings of the high frequency transformer. A secondary high frequency waveform is generated on the by magnetically coupling the primary windings to secondary windings using the core of the HFT 206. The PET modulates the secondary high frequency waveform using the matrix converter 204 to a desired 3Ø waveform u, v, w for use by the load 205. The matrix converter 204 modulates the secondary high frequency waveform according to the needs of the load. Frequency and voltage of the modulated waveform can be selected to match the operating parameters of the load. For example, voltage can be selected using a ratio of primary turns to secondary turns of the corresponding windings of the high frequency transformer of the PET.

In some embodiments, each switches $S_1$ and $S_2$ are implemented using a single two-quadrant semiconductor switch. The switches $S_1$ and $S_2$ can be switched opposite each other at a desired high frequency. For example, switches $S_1$ and $S_2$ can be switched in a complementary fashion with a 50% duty cycle such that S1 is closed or conducting when $S_2$ is open or non-conducting and vice versa. It is understood that other duty cycles are possible for $S_1$ and $S_2$ without departing from the scope of the present subject matter. The illustrated PET 200 includes two primary windings for each phase of the transformer. For example, primary windings $a_1$ and $a_2$ are associated with a first phase of the transformer, primary windings $b_1$ and $b_2$ are associated with a second phase of the transformer, and primary windings $c_1$ and $c_2$ are associated with a third phase of the transformer. A first switch $S_1$ couples together a first terminal of a first winding $a_1, b_1, c_1$, of each phase for a first portion of a switching cycle and also decouples a first terminal of the second winding $a_2, b_2, c_2$, of each phase. During a second portion of the switching cycle, a second switch $S_2$ couples together the first terminal of a second winding $a_2, b_2, c_2$, of each phase and also decouples the first terminal of the first winding $a_1, b_1, c_1$, of each phase. The first $a_1, b_1, c_1$, and second $a_2, b_2, c_2$ winding of each phase each have a second terminal coupled to a phase $v_a, v_b, v_c$ of the source 201 and each phase pair of windings are oriented with opposite polarity with respect to their corresponding secondary winding.

The transformer 200 includes some leakage inductance (not shown) on both the primary and secondary windings. Leakage inductance can cause disturbances such as spikes in voltage and current when the winding is connected and disconnected from a circuit and current is flowing in the winding or the circuit at the time of the switch event. Resistor, capacitor and diode (RCD) clamp circuits can be used to dissipate these disturbances. Because the push-pull topology 200 couples and decouples two primary windings, disturbances caused by leakage inductance is dealt with in the primary windings separately from the secondary winding, thus RCD clamp circuits can be coupled to both the primary and secondary windings. In situations where the power source is a high voltage source, it is impractical to use RCDs to reduce the effects of leakage inductance in the primary windings. RCDs sink energy and can reduce efficiency of a circuit, even more so with high voltage circuits. RCDs require the capacitor of the RCD to be maintained at a voltage twice the magnitude of the circuit voltage. The higher voltages required to maintain the voltage of the RCD capacitors require the use of switches having higher voltage ratings. Control and manufacturing of power semiconductor switches at high voltage is technically challenging.

A control strategy for the illustrated push-pull PET of FIG. 2, according to one embodiment of the present subject matter, can eliminate RCDs for controlling disturbances caused by leakage inductance of the primary windings. Leakage inductance disturbances can be eliminated when switching occurs with no current flowing in a winding. This can be called zero-current switching (ZCS). In addition to eliminating the leakage inductance effect, ZCS can also significantly reduce switching losses, such as thermal losses, associated with operating the primary winding switches $S_1, S_2$. In various examples, the current in ZCS can be zero or a non-zero small value.

In various embodiments, the topology 200 includes a matrix converter 204 coupled to the secondary windings A, B, C. The matrix converter 204 transforms the high frequency output waveform of the transformer to a load waveform having selectable voltage and frequency. According to various embodiments, a method of operating the matrix converter 204 includes applying a zero vector to the output of the transformer to cause the primary winding currents to go to zero. When the primary winding currents are zero, S1 and S2 can be switched without producing switching losses or disturbances associated with the leakage inductance of the primary windings.

Figure 3:
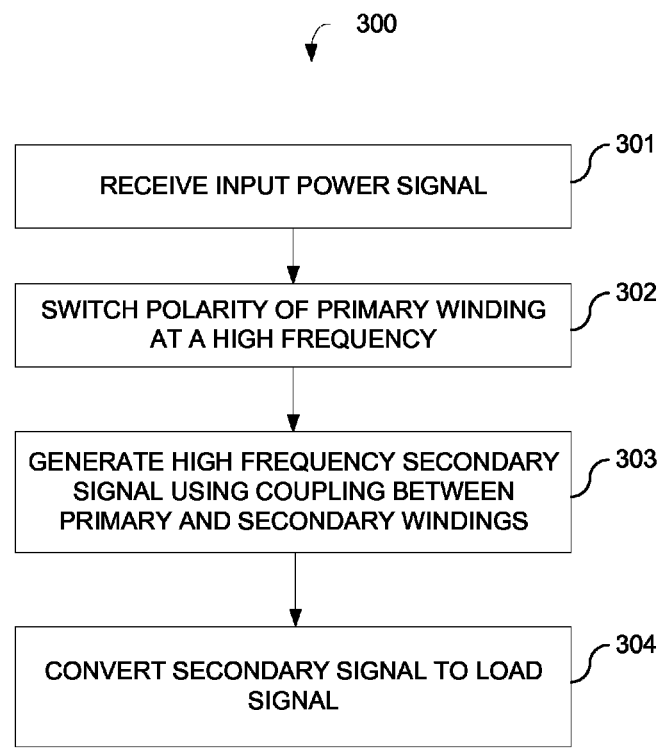
FIG. 3 illustrates generally a flowchart of a method 300 to control a push-pull PET transformer according to one embodiment of the present subject matter.

FIG. 3 illustrates generally a flowchart of a method 300 to control a push-pull PET transformer according to one embodiment of the present subject matter. The method includes: at 301, receiving a low frequency power signal at a primary winding; at 302, switching a polarity of the primary winding at a high frequency; at 303, generating a secondary waveform using a coupling between the primary winding and a secondary winding; and at 304, converting the secondary waveform to a load waveform having a predetermined frequency and voltage.

The method of FIG. 3 can be applied to the embodiment illustrated in FIG. 2. Input line to neutral voltages can be given by, $$v_{an_i} = V_i \cos(\omega_i t)$$
$$v_{bn_i} = V_i \cos\left(\omega_i t - \frac{2\pi}{3}\right)$$
$$v_{cn_i} = V_i \cos\left(\omega_i t + \frac{2\pi}{3}\right),$$

where, $v_{an_i}$, $v_{bn_i}$, $v_{cn_i}$ are the phase voltages $v_a$, $v_b$, $v_c$ on the primary side of the transformer measured between their respective voltage source and point $n_i$, $V_i$ is the peak voltage of the 3Ø power source, and $\omega_i$ is the frequency of the 3Ø power source in radians/second. Secondary side voltages can be given by, $$v_{AN} = (-1)^k v_{an_i}$$
$$v_{BN} = (-1)^k v_{bn_i}$$
$$v_{CN} = (-1)^k v_{cn_i} \ldots k=0,1,$$

where $v_{AN}$, $v_{BN}$, $v_{CN}$ are the phase voltages on the secondary side of the high frequency transformer measured across each secondary winding and point N, k=0 when $S_1$ is on, and k=1 when $S_2$ is on.

Figure 4A:
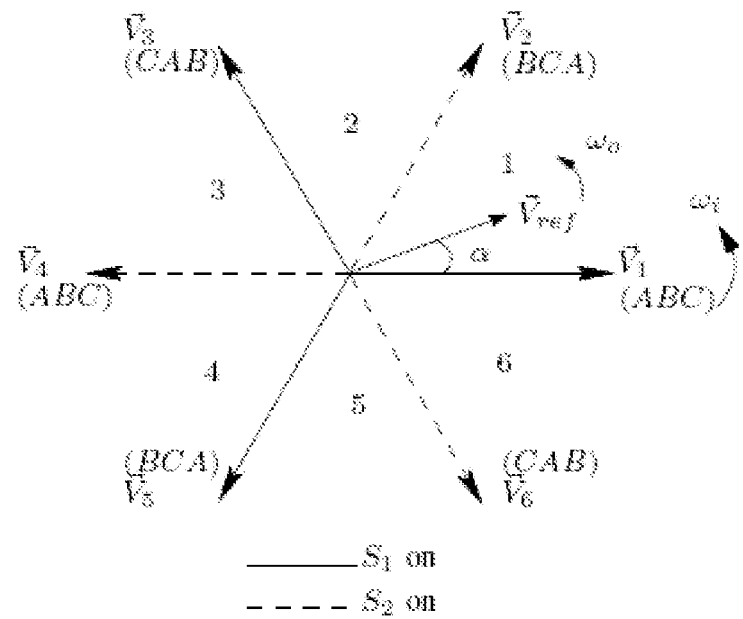
FIGS. 4A and 4B show space vectors used for a control method according to one embodiment if the present subject matter.
Figure 4B:
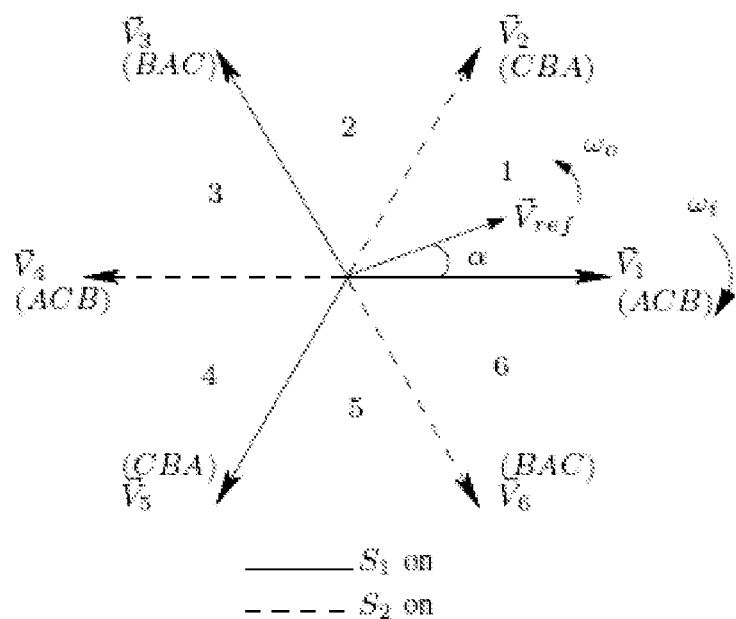

In some embodiments, a matrix converter can include 27 unique switching states. Six of these switching states generate synchronously rotating space vectors. These vectors result in zero common-mode voltage at the load terminals. An output voltage space vector $\vec{V}_o$ can be defined by, $$\vec{V}_o = v_{un_0} + v_{vn_0} e^{\frac{j2\pi}{3}} + v_{wn_0} e^{\frac{-j2\pi}{3}}$$

where $v_{un_0}$ is the voltage measured on leg u with reference to point $n_0$.
Depending on the direction of rotation, the synchronously rotating vectors can be further divided into two groups, counter-clockwise (ccw) and clockwise (cw). The three ccw rotating vectors $\vec{V}_1$, $\vec{V}_3$, and $\vec{V}_5$ marked in FIG. 4A are obtained when k=0 and (uvw) are connected to (ABC), (CAB) and (BCA) respectively where, u, v, w, A, B, C are points marked in FIG. 2. When k=1, vectors $\vec{V}_2$, $\vec{V}_4$ and $\vec{V}_6$ are obtained. Similarly, the space vectors rotating in clockwise direction are shown in FIG. 4B. Thus, every switching cycle, the average output voltage vector can be synthesized using these six vectors. These six vectors divide the complex plane into six symmetrical sectors. At any instant of time, the reference voltage vector will be in a particular sector. The reference voltage vector is given by, $$\vec{V}_{ref} = \vec{V}_{sv} = \bar{v}_{un_O} + \bar{v}_{vn_O} e^{\frac{j2\pi}{3}} + \bar{v}_{wn_O} e^{\frac{-j2\pi}{3}}$$

Where the average voltage of each load phase u, v, w can be, $$\bar{v}_{un_O} = V_o \cos(\omega_o t + \phi)$$
$$\bar{v}_{vn_O} = V_o \cos\left(\omega_o t + \phi - \frac{2\pi}{3}\right)$$
$$\bar{v}_{wn_O} = V_o \cos\left(\omega_o t + \phi + \frac{2\pi}{3}\right),$$

where $V_O$ is the peak of the average output voltage of the load waveform and $\omega_o$ is the frequency of the load waveform u, v, w.

This reference voltage vector $\vec{V}_{ref}$ is generated on an average over one switching cycle $T_s$ using the two vectors forming that sector. For example, if $\vec{V}_{ref}$ lies in the first sector, vectors $\vec{V}_1$ and $\vec{V}_2$ are used, such that $\vec{V}_{ref} = d_1 \vec{V}_1 + d_2 \vec{V}_2$, where $d_1$ and $d_2$ are the fraction of time for which vectors $\vec{V}_1$ and $\vec{V}_2$ are applied respectively. Mathematically, $d_1$ and $d_2$ are given by, $$d_1 = m \frac{2}{\sqrt{3}} \sin\left(\frac{\pi}{3} - \alpha\right)$$
$$d_2 = m \frac{2}{\sqrt{3}} \sin(\alpha)$$

Where,
$$m = \frac{V_o}{V_i}$$
$$d_1, d_2 <= 0.5$$

The values of $d_1$ and $d_2$ are constrained to 0.5 because $\vec{V}_1$ and $\vec{V}_2$ are available for a maximum of 50% of the switching cycle $T_s$. Hence, if only the two adjacent space vectors are used, the maximum modulation index, m is limited to 0.5. Three adjacent voltage vectors can be used to obtain a modulation index of 0.75 at the cost of additional switching.

Figure 5:
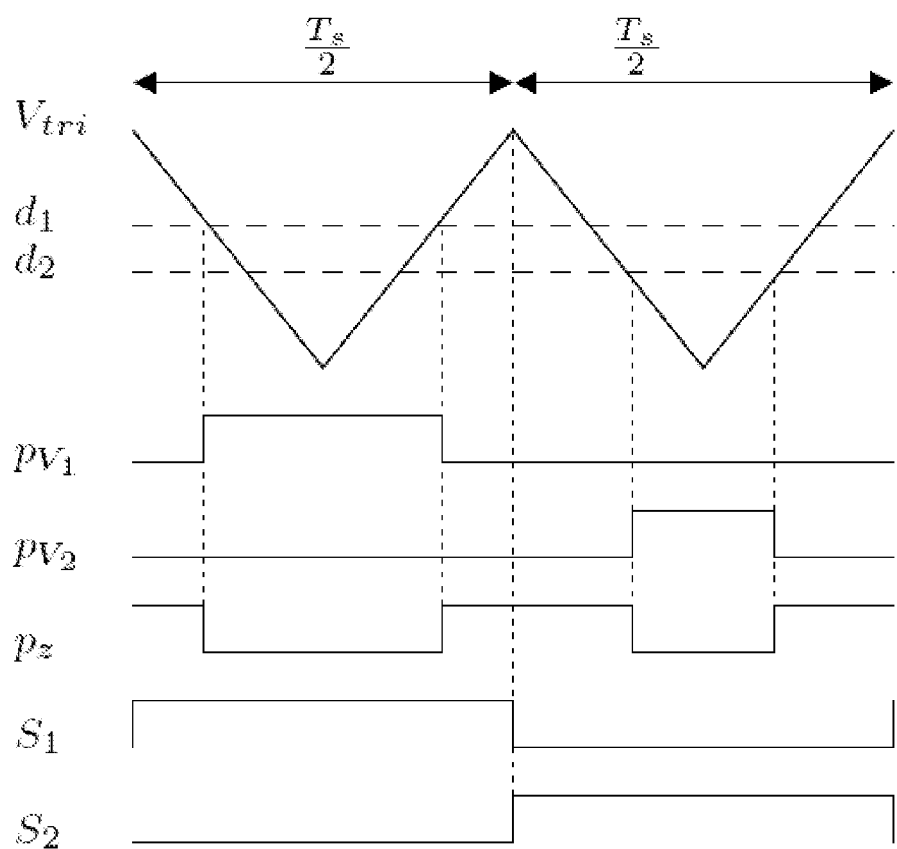
FIG. 5 shows converter switching pulses for one cycle of a PET according to one embodiment of the present subject matter.

The switching pulses for one cycle according to one embodiment of the present subject matter are shown in FIG. 5. The duty ratios $d_1$ and $d_2$ are compared with a triangular carrier waveform, $V_{tri}$ to generate pulses $p_{V1}$ and $p_{V2}$. $V_{tri}$ can have a peak value of 1 and its frequency is two times the frequency of $S_1$ and $S_2$. In sector one, $\vec{V}_1$ is available when $S_1$ is on, therefore, $p_{V1}$ is high in the first half of the cycle and $p_{V2}$ is high in the second half of the cycle. Zero vectors are applied in the remaining time of the cycle. $p_z$ is the switching pulse for the zero vector. In each half cycle, the active vectors are buffered by zero vectors on either side. In one switching cycle, ccw vectors are used, and in the following cycle, cw vectors are used to synthesize the average output voltage. As ccw and cw rotating vectors are used for an equal duration of time, unity power factor is obtained on the input side of the PET.

Figure 6A:
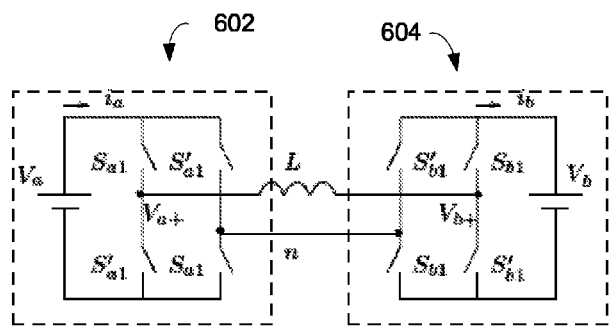
FIG. 6A shows a DC-DC converter circuit using two H-bridge converters connected to each other through a transformer according to one embodiment of the present subject matter.
Figure 6B:
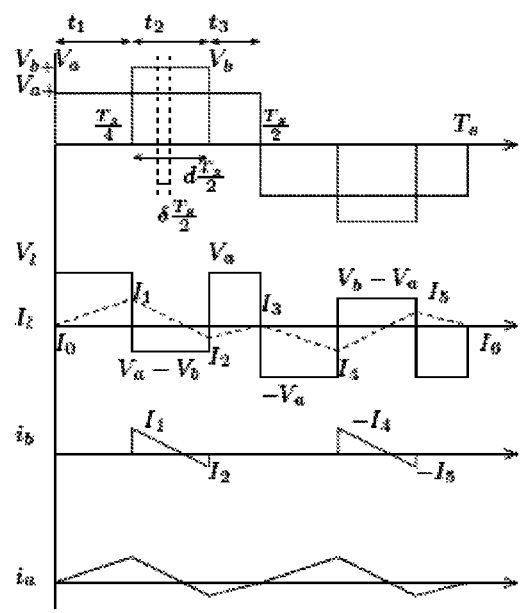
FIG. 6B shows DC-DC converter switching pulses and circuit measurements according to one embodiment of the present subject matter.

FIG. 6A shows a DC-DC circuit using two H-bridge converters connected to each other through a transformer. The magnetizing current of the transformer can be neglected for analysis, therefore, the transformer is approximated by its leakage inductance, L. The leakage inductance L can be used to transfer power between the two DC voltage sources, $V_a$ and $V_b$. The switches $S_{a1}$ and $S'_{a1}$ of a first (or primary) converter 602 can be switched at a constant frequency, $f_s$ with 50% duty ratio, in a complementary fashion. The switches of a second (or secondary) converter 604 can be switched to produce an alternating voltage pulse having a duty ratio d. The switch pulses of the first converter 602 and the second converter 604 can be phase shifted from each other by time $$\delta \frac{T_s}{2}$$

as shown in FIG. 6B. Power transfer between the two DC voltage sources can be controlled using, among other things, the phase shift between the pulses of the first converter 602 and the second converter 604. FIG. 6B, also shows the voltage, $V_1$ and current $I_1$ waveforms across the leakage inductance L of the DC-DC converter. In the illustrated example, the inductor current $I_1$ goes to zero every half cycle generating an average voltage across the leakage inductance L of about zero per half cycle. Mathematically, the average voltage across the leakage inductance L over a half cycle period $T_s/2$ can be given by:

$$<V_L>_{\frac{T_s}{2}} = V_a\left(\frac{T_s}{2} - d\frac{T_s}{2}\right) + (V_a - V_b)d\frac{T_s}{2},$$

where $V_a$ is the voltage of one DC source, $V_b$ is the voltage of a second DC source, $T_s$ is the period of the switching frequency $f_s$ of $S_{a1}$ and $S'_{a1}$. When $<V_L>$ is zero, the current through the primary winding can go to zero providing an opportunity to switch the primary converter without causing primary winding disturbances.
Solving for $<V_L>=0$ gives $$d = \frac{V_a}{V_b},$$

which gives the duty cycle of the voltage pulse and thus the switching schedule of the secondary switches.

For zero current switching, $t_3$ is greater than zero, and the value of $\delta$ is limited by, $$0 \le \delta \le (1-d)\frac{1}{2}.$$

Mathematically, the other values of the example of FIG. 6B are given by, $$t_1 = \frac{1}{4}(T_s + 2\delta T_s - dT_s)$$

$$t_2 = \frac{dT_s}{2}$$

$$t_3 = \frac{T_s}{2} - t1 - t2$$

$$I_0 = I_3 = I_6 = 0$$

$$I_1 = I_0 + \frac{V_a}{L}t_1$$

$$I_2 = I_1 + \frac{(V_a - V_b)}{L}t_2$$

$$I_3 = I_2 + \frac{V_a}{L}t_3$$

$$I_4 = -I_1$$

$$I_5 = -I_2$$

$$P_b = \left(\frac{V_b}{T_s}\right)\left(\frac{I_1 + I_2}{2} + \frac{-I_4 - I_5}{2}\right)t_2,$$

Where $P_b$ represents the power transferred from the first converter to the second converter. The power transferred from the second converter to the first converter is given by, $$P_{ab} = d\delta \frac{V_a V_b}{2Lf_s}.$$

The power transferred between the two converters is a function of the duty ratio d of the second converter switches, the offset between the switching pulses of the first and second converters $\delta$, the switching frequency $f_s$, and the voltages of the first and second voltage sources $V_a$ and $V_b$.

Figure 7:
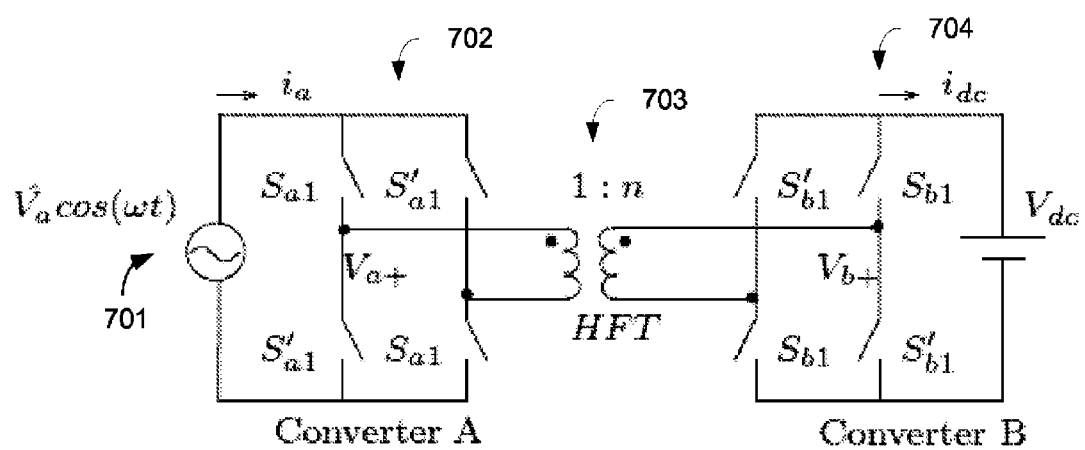
FIG. 7 shows a PET topology for a single phase AC-DC system according to one embodiment of the present subject matter.

FIG. 7 shows a PET topology for a single phase AC-DC system. In this topology, AC source 701 compares to the DC source connected to first converter 602 in the topology of FIG. 6A. AC source 701 has magnitude, $$\hat{V}_a \cos(\omega t).$$

where $\hat{V}_a$ is the peak voltage of the primary side voltage source and $\omega$ is the frequency of the primary side voltage source in radians per second.

Switches $S_{a1}$ and $S'_{a1}$ of the first converter 702 can be switched at a constant frequency and at 50% duty ratio in a complementary fashion. The switches $S_{b1}$ and $S'_{b1}$ of the second converter 704 can be pulse width modulated such that a duty ratio, d(t) of the switches is given by, $$d(t) = \frac{\hat{V}_a \cos(\omega t)}{V_{dc}}.$$

In various examples, the switching frequency $f_s$ can be much higher than the input voltage frequency $\omega/2\pi$. During one switching interval, the ac-dc converter can be approximated as a dc-dc converter with $V_a(t)=\hat{V}_a \cos(\omega t)$ and $V_b=V_{dc}$. Soft switching, or zero current switching, in the first converter can be accomplished while the inductor current is at zero at the end of each half cycle. An average voltage of zero across the inductor per half cycle can cause the inductor current to go to zero. The value of the duty cycle d can be determined by these constraints such that, $$\langle V_L \rangle_{\frac{T_s}{2}} = \hat{V}_a\cos(\omega t)\left(\frac{T_2}{2} - d(t)\frac{T_s}{2}\right) + \left(\hat{V}_a\cos(\omega t) - V_{dc}\right)d(t)\frac{T_s}{2}$$

$$d(t) = \frac{\hat{V}_a\cos(\omega t)}{V_{dc}}$$

where $<V_L>$ equals the voltage across the leakage inductance of the high frequency transformer 703.

Accordingly, the phase shift between the switching pulses is given by, $$0 \le \delta \le \frac{1}{2}(1 - d(t)_{max})$$

$$0 \le \delta \le \frac{1}{2}\left(1 - \frac{\hat{V}_a}{V_{dc}}\right)$$

The phase shift δ can be a constant to achieve unity power factor at the AC source. With δ fixed, the power transferred can be calculated by integrating the power transferred per switching cycle over one period of the low frequency input waveform.

$$P(t) = d(t)\delta \frac{V_{dc}\hat{V}_a \cos(\omega t)}{2Lf_s}$$

$$P(t) = \frac{\delta \hat{V}_a^2}{2Lf_s}\cos^2(\omega t)$$

$$P_{avg} = \frac{1}{2\pi}\int_0^{2\pi} P(\omega t)d(\omega t)$$

$$P_{avg} = \frac{\delta \hat{V}_a^2}{4Lf_s}$$

The average power transferred between converter 702 and converter 704 is a function of the δ, $\hat{V}_a$, switching frequency $f_s$, and leakage inductance L. A power balance equation for the system of FIG. 7 can be, $$P(t) = V_a(t)I_a(t) = V_{dc}I_{dc}$$

It follows then that the average current in a switching interval can be equal and given by, $$I_a(t) = \frac{1}{\hat{V}_a \cos(\omega t)} \frac{\delta \hat{V}_a^2}{2Lf_s}\cos^2(\omega t)$$

$$I_a(t) = \frac{\delta \hat{V}_a}{2Lf_s}\cos(\omega t).$$

This current is in phase with the voltage Va, thus, providing unity power factor.

Figure 8A:
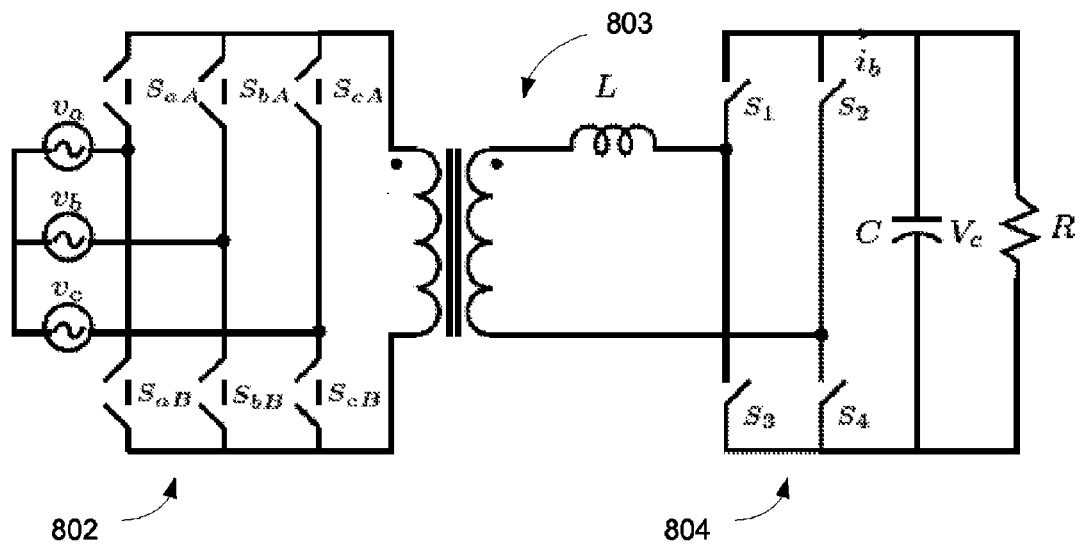
FIG. 8A shows a 3Ø PET according to one embodiment of the present subject matter.

The AC to DC PET topology of FIG. 7 can be extended to a three-phase PET topology as illustrated in FIG. 8A. The topology uses the leakage inductance L to transfer power bi-directionally between the three-phase primary side 802 of the PET and the DC secondary side 804 of the PET. The DC secondary side 804, also referred to as the secondary converter, can operate on the same principle as that of the single phase topology described above with reference to FIG. 7.

Figure 8B:
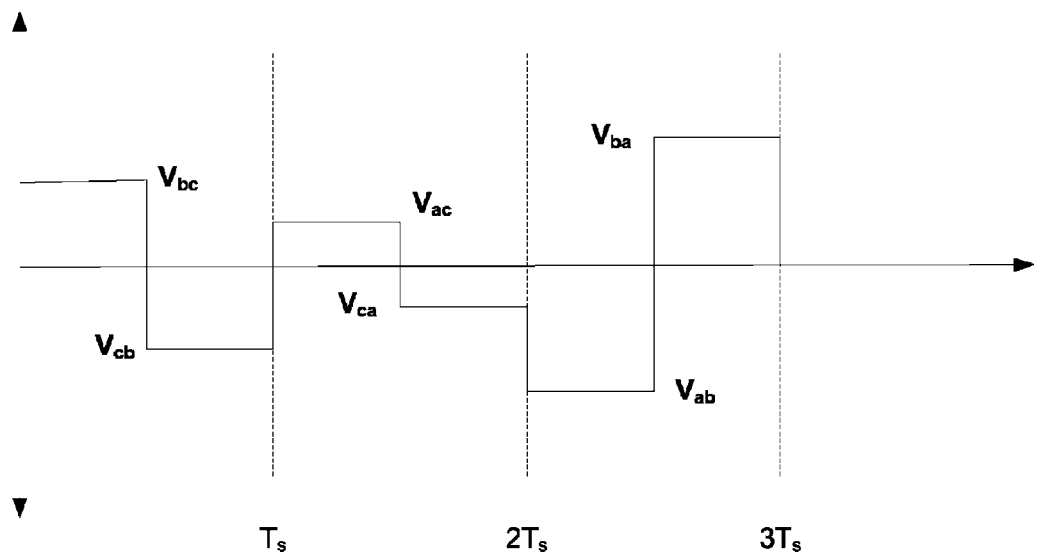
FIG. 8B shows a waveform associated with a 3Ø PET according to one embodiment of the present subject matter.

The primary side converter 802 has three legs. An analogy between the present topology and that of FIG. 7 can be made such that control of the three phase topology is a combination of different single phase topologies. For example, when switches $S_{aA}$ and $S_{aB}$ are open, only phase $v_b$ and $v_c$ can be connected connected to the primary winding of the HFT 803. In a first portion of a switching period, switches $S_{bA}$ and $S_{cB}$ can be closed and during a second portion of the switching period switches $S_{cA}$ and $S_{bB}$ can be closed resulting in the first third of the waveform of FIG. 8B. In such a situation, the primary converter 802 of the three-phase topology is analogous to the single phase topology of FIG. 7 with only two legs of the converter coupled to the line-to-line primary power signal. Control of the secondary converter 804 is identical to the single phase embodiment described above except each third of the waveform of FIG. 8B represents a switching cycle. The second third of the waveform results from switches $S_{aA}$ and $S_{cB}$ being closed during a first portion and switches $S_{cA}$ and $S_{aB}$ being closed during a second portion. The last third of the waveform results from switches $S_{aA}$ and $S_{bB}$ being closed during a first portion and switches $S_{bA}$ and $S_{aB}$ being closed during a second portion.

Figure 9:
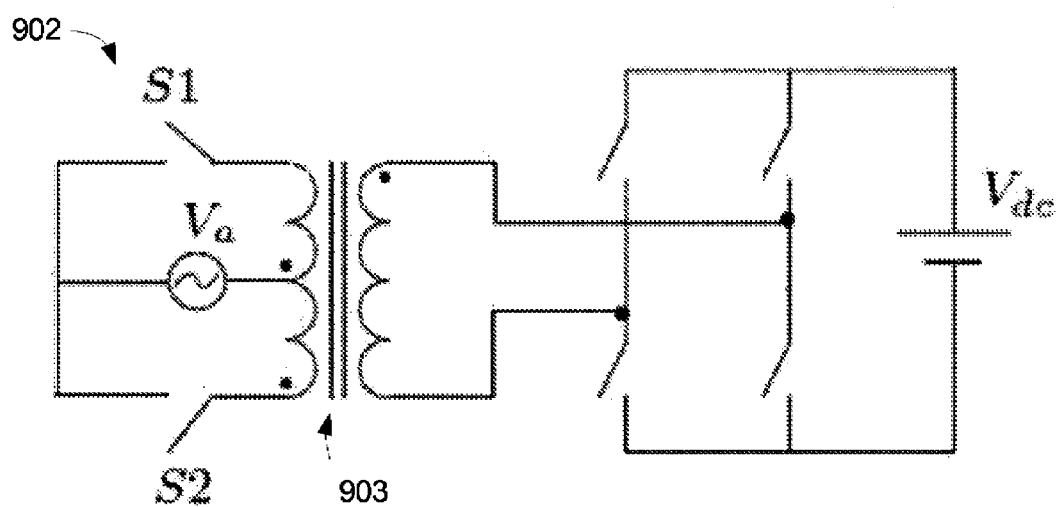
FIG. 9 shows a single phase PET topology according to one embodiment of the present subject matter.

FIG. 9 shows a single phase PET topology according to one embodiment of the present subject matter. Unlike the topology of FIG. 7, in which the primary side converter uses a full bridge, (four switches), the topology of FIG. 9 uses a push pull configuration including a primary converter 902 having two switches $S_1$ and $S_2$ and a high frequency transformer 903 having two primary windings (shown on the left side). The primary converter 902 switches are switched at a high frequency in a complementary fashion with a 50% duty ratio to provide a high frequency waveform on the primary windings of the transformer 903. The topology on the secondary side of the high frequency transformer 903 is the same as discussed above with respect to FIG. 7. As a result, even though the single phase push-pull topology of FIG. 9 introduces the potential for primary winding leakage inductance disturbances independent of the secondary winding, the control of the second converter, as discussed above, provides zero switching current of the two primary converter switches. The topology of FIG. 9 uses less primary converter switches than the topology of FIG. 7 but uses an additional primary winding.

Figure 10:
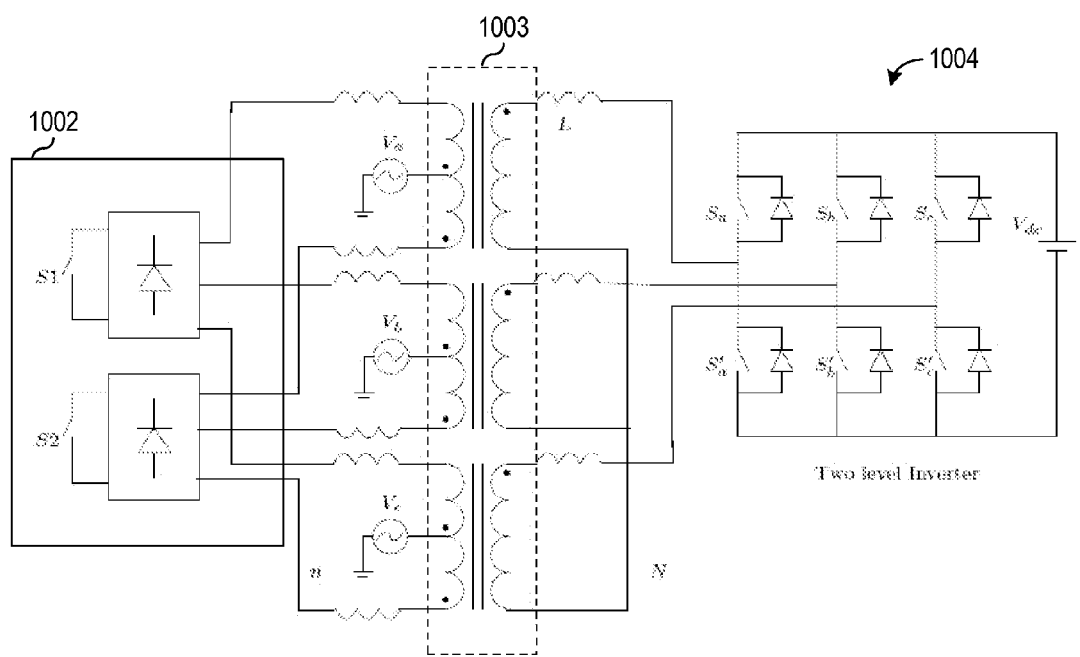
FIG. 10 shows a 3Ø AC-DC PET push-pull topology according to one embodiment of the present subject matter.

The topology of FIG. 9 can be replicated two times to form a 3Ø push pull topology. In such an embodiment, the primary converters includes six switches, the secondary converter includes twelve switches, and the operation of the switches can be applied directly from that discussed above. FIG. 10 shows a 3Ø AC-DC PET push-pull topology according to one embodiment of the present subject matter. The topology is also an extension of the single-phase push-pull topology of FIG. 9, but continues to use only two primary converter switches and a two-level inverter for the secondary converter. A PET transformer according to this topology can be used for, among other things, power transfer and conversion between a three phase AC system and a DC system. The topology includes the primary converter 1002, a high frequency link 1003 including three, three-winding high frequency transformers, and secondary converter 1004 including the two-level inverter. In various embodiments, the topology and associated control scheme provide soft switching of the primary converter 1002 for varying load conditions, power factor correction at the primary input $V_a$, $V_b$, $V_c$, bi-direction power flow, and simplified control due to linear dependence of power flow on the available control variables. The topology is adaptable to a number of applications that include a DC link between a device and a power distribution system including, but not limited to, wind power generation, motors, batteries, photovoltaic cells, storage capacitors, or combinations thereof.

The two level inverter is switched using Space-Vector-Modulation techniques to transfer power between the AC and DC sides. Three phase voltage can be generated at the output side from the dc voltage, $V_{dc}$. DC to AC power generation has been studied extensively in literature, hence the following analysis describes only the 3Ø AC-DC PET topology.

In various embodiments, switches S1 and S2 of FIG. 10 are switched at a constant frequency and 50% duty ratio in a complementary fashion.

Mathematically, balanced low frequency three phase AC voltages can be given by, $$V_a(t) = \hat{V}_{pk}\cos(\omega t)$$

$$V_b(t) = \hat{V}_{pk}\cos\left(\omega t - \frac{2\pi}{3}\right)$$

$$V_c(t) = \hat{V}_{pk}\cos\left(\omega t + \frac{2\pi}{3}\right)$$

where $V_{pk}$ is the peak voltage of the AC source.

A primary switching interval, $T_s$ can be divided into two halves, one half when S1 is ON and the other half when S2 is ON. When S1 is ON, a primary voltage space vector $\vec{V}_{sv}(t)$ is given by, $$\vec{V}_{sv}(t) = V_a(t) + V_b(t)e^{j\frac{2\pi}{3}} + V_c(t)e^{j\frac{4\pi}{3}}$$

When S2 is ON, the primary voltage space vector is 180 degrees out of phase of $\vec{V}_{sv}(t)$. A space vector can provide a phase relationship of a voltage waveform.

Thus, the primary voltage space vector is a vector that oscillates 180 degrees as it rotates. The oscillation frequency is determined by the switching frequency of S1 and S2 of the primary converter and the rotation is determined by the frequency of the AC voltage source coupled to the primary converter.

The secondary converter control scheme seeks to provide soft switching of the primary converter switches and pulse width modulation of the secondary winding voltage waveform to transfer power between the AC source coupled to the primary converter and the DC source coupled to the secondary converter. An secondary voltage space vector of the two level inverter can be given by $$\vec{V}_o = V_A + V_B e^{j2\pi/3} + V_C e^{-j2\pi/3}.$$

A space vector can also be used to synthesize a waveform from an inverter such as the two-level inverter 1004 of FIG. 10. A switching cycle of the two level inverter 1004 can be represented as a space vector graph having six sectors. Each sector is bounded by a switch state of the three complementary switch pairs of the two level inverter. For example, if switch $S_a$ and $S_b$ are ON and switch $S_c$ is OFF, the voltage across the DC source of FIG. 10 can be given by, $$\vec{V}_o = V_{dc} + V_{dc}e^{j2\pi/3}.$$
$$= V_{dc}e^{j\pi/3}$$

Figure 11:
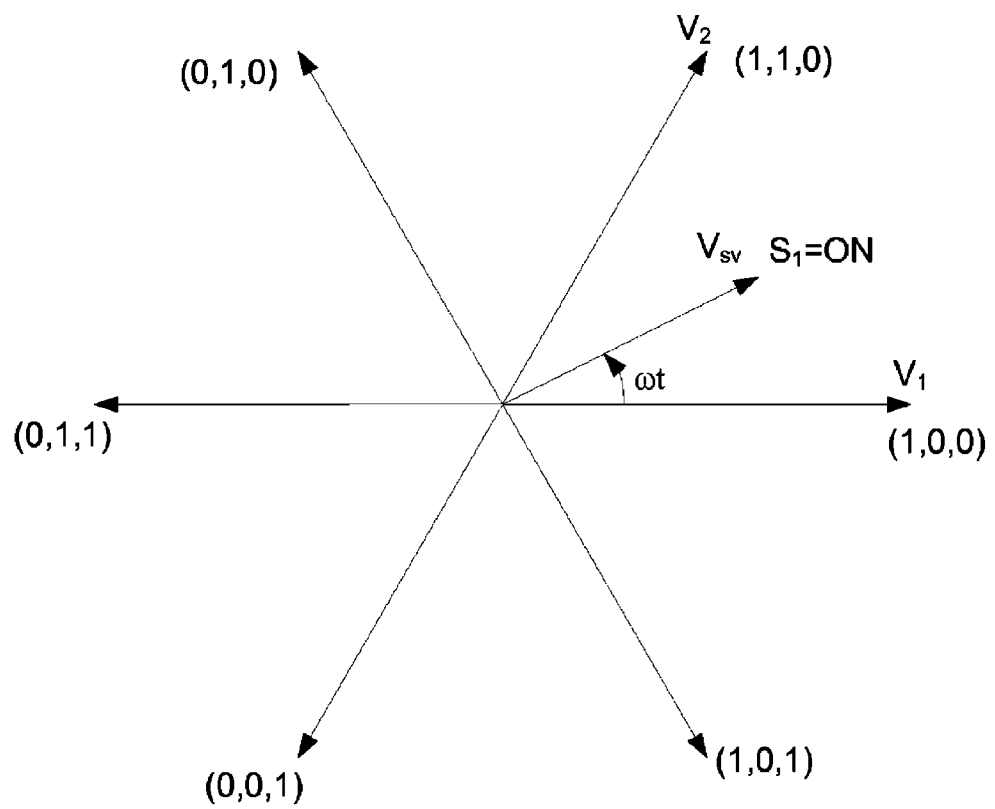
FIG. 11 shows a vector diagram illustrating the six sectors associated with the switching states of a two-level inverter according to one embodiment of the present subject matter.

The above example is shown as vector $V_2$ in FIG. 11. FIG. 11 is a vector diagram illustrating the six sectors associated with the switching states of the two-level inverter. The six boundary vectors indicate switching states of the complementary switching pairs of the two-level inverter, where the first digit represents switch pair $S_a$ and $S'_a$ with $S_a$ ON, the second digit represents switch pair $S_b$ and $S'_b$ with $S_b$ ON, and the third digit represents switch pair $S_c$ and $S'_c$ with $S_c$ ON. Two additional switching states (0,0,0) and (1,1,1) represent zero vectors at the origin of the graph. The switching pairs operate in complementary fashion such that when one switch of the pair is ON, the other switch of the pair is OFF. FIG. 11 further shows an example state of the system of FIG. 10 where the primary space vector $\vec{V}_{sv}$ is in sector 1 and primary converter switch S1 is ON. With S1 ON, $$\vec{V}_{sv} = \frac{3}{2}V_{pk}e^{j\omega t},$$

The secondary vectors bordering the first sector include vector $V_1$ when switch $S_a$ is ON and switches $S_b$ and $S_c$ are OFF and vector $V_2$ when switches $S_a$ and $S_b$ are ON and switch $S_c$ is OFF.

Figure 12:
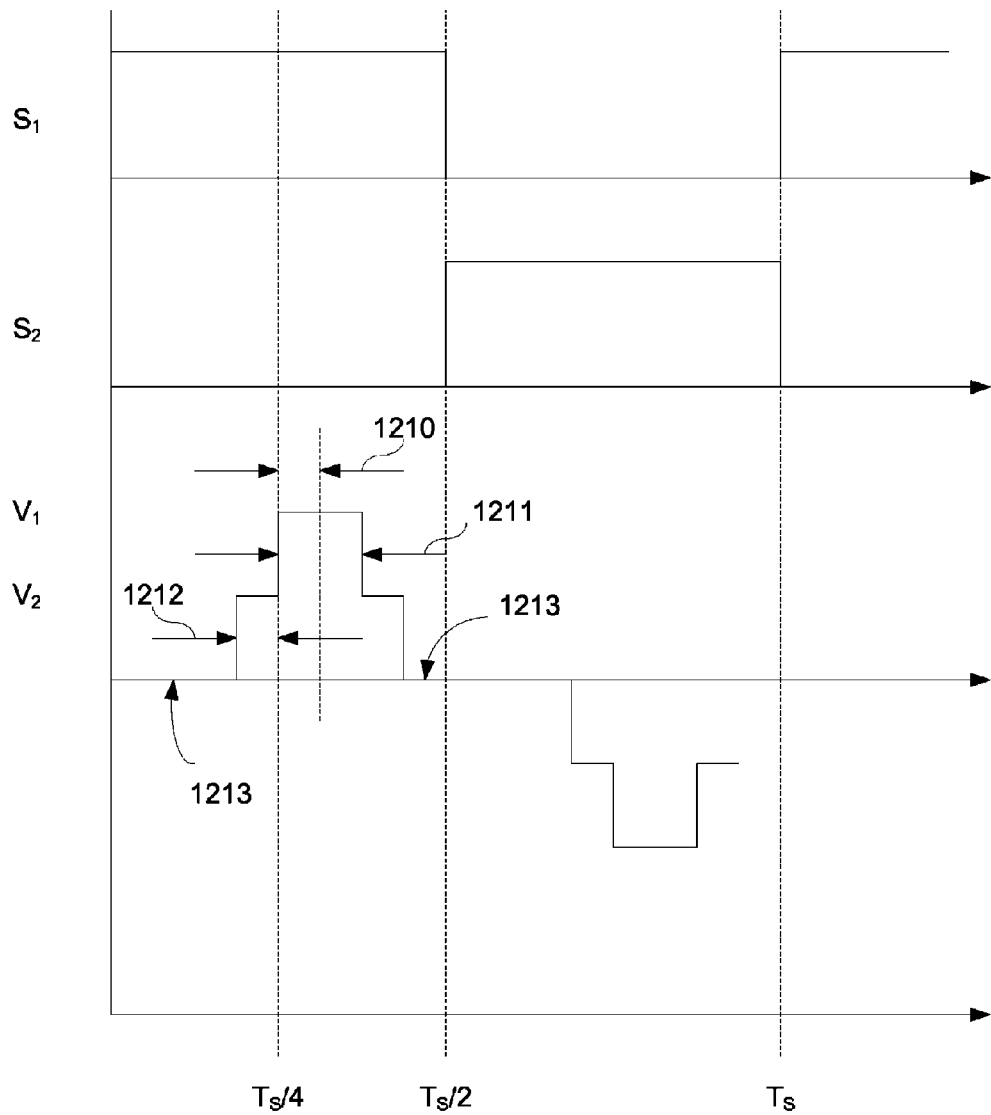
FIG. 12 shows a switching interval $T_s$ where S1 of a primary converter is ON during the first half of the switching cycle and S2 is ON during the second half of the switching cycle for a 3Ø AC-DC PET push-pull topology according to one embodiment of the present subject matter.

To determine the duty cycle of each applied vector, set $$\vec{V}_{sc} = d_1\vec{V}_1 + d_2\vec{V}_2$$

where $d_1$ and $d_2$ are the duty ratios for the two level inverter switch states associated with secondary space vectors $V_1$ and $V_2$ respectively. In general, the duty cycles will be applied symmetrically about an offset from the center of the interval that defines the S1 pulse. For example FIG. 12 shows a switching interval $T_s$ where S1 of the primary converter is ON during the first half of the switching cycle and S2 is ON during the second half of the switching cycle. While S1 is ON and Vs is in the first vector, the voltage pulse across the leakage inductance of a secondary winding is shown. The pulse can be multi leveled and offset from the center of the S1 pulse by $\delta T_s/2$ (1210). The pulse itself can be symmetrical, for example, the V1 voltage can be applied with a $d_1$ duty cycle (1211) between two portions of the V2 voltage, where each V2 portion is applied for half of the d2 duty ratio (1212).

Zero vectors 1213 are applied outside the duty cycles of the inverter switches. Zero vectors may be applied with switches $S_a$, $S_b$ and $S_c$ all ON or all OFF. Soft switching for S1 and S2 can be obtained when the primary currents, $I_a$, $I_b$ and $I_c$ go to zero every half cycle. The primary currents $I_a$, $I_b$ and $I_c$ can go to zero when the average voltage applied across the primary windings is configured to be zero over each half cycle.

Mathematically, the offset $\delta$ can be determined from $$\frac{T_s}{4} - \left(\delta\frac{T_s}{2} + \left(\frac{d_1+d_2}{2}\right)\frac{T_s}{2}\right) \geq 0$$

$$\delta \leq \frac{1}{2}\left(1 - \frac{\sqrt{3}\hat{V}_{pk}}{V_{dc}}\right)$$

With the value of $\delta$ fixed, average phase currents, as well as an average dc current, are given by, $$I_a = \frac{\hat{V}_{pk}\delta}{4Lf_s}\cos(\alpha)$$

$$I_b = \frac{\hat{V}_{pk}\delta}{4Lf_s}\cos(\alpha - 2\pi/3)$$

$$I_c = \frac{\hat{V}_{pk}\delta}{4Lf_s}\cos(\alpha + 2\pi/3)$$

$$I_{dc} = \frac{3V_{pk}^2\delta}{8Lf_sV_{dc}}$$

The average power is given by $$P_{avg} = \frac{3V_{pk}^2 \delta}{8Lf_s}$$

$P_{avg}$ is noted to be directly proportional to $\delta$ and the square of $V_{pk}$.

The power electronic transformers described herein may, for example, find use in applications requiring a high-frequency transformer, related to grid connection of wind power generators, related to power transmission and distribution, or electric drives. In certain examples, the present power electronic transformers are used in conjunction with wind power generators. Wind plants typically produce electrical energy at relatively low voltage (e.g., about 690V), which is transformed into medium voltage energy (e.g., about 34.5 kV) by power transformers. The AC to DC PET topologies illustrated herein provide controllable bi-directional energy transfer. Applications include exchanging power between a power grid and an energy storage device such as a battery back for a hybrid or electric vehicle. In addition to charging the battery pack, the topology allows energy to be transferred from the battery pack to the grid, such as during peak energy demand. In certain examples, the present power electronic transformers are used in transmission and distribution systems. Transformers are a building block of various transmission and distribution systems. As a result, transformer reliability is important. The present inventors have recognized that due to the use of numerous semiconductor switches, which the inventors have found to make transformer operation more complicated and less reliable, previous attempts to replace conventional transformers with power electronic transformers would likely have failed. However, the disclosed scheme of power electronic transformers use is simpler—involving less switches—and is believed to be suitable for use in transmission and distribution systems.

Additional Notes

The examples disclosed herein can be verified by stimulation or theoretical analysis.

The above Detailed Description includes references to the accompanying drawings, which form a part of the Detailed Description. The drawings show, by way of illustration, specific embodiments in which the invention can be practiced. These embodiments are also referred to herein as "examples."

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable Inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "including" and "comprising" are open-ended, that is, a system, assembly, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, while some of the above-described examples are described as comprising only two (high voltage rated) semiconductor switches, numerous lower voltage rated switches connected together may alternatively be used. Other embodiments can be used, such as by one of ordinary skill in the art upon reviewing the above description. Also, in the above Detailed Description, various features may have been grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

What is claimed is:

1. An apparatus comprising:
   a transformer having primary windings and secondary windings, the primary windings of the transformer configured to receive a first multi-phase power signal having a first frequency, wherein the primary windings include, for each phase of the multi-phase power signal, a first primary winding and a second primary winding magnetically coupled in direct phase opposition to the first primary winding;
   a primary converter configured to generate a second multi-phase power signal having a second frequency at the secondary windings, the second frequency substantially higher than the first frequency, wherein the primary converter includes:
      a first switch configured to couple together the first primary windings of each phase; and
      a second switch configured to couple together the second primary windings of each phase;
   a secondary converter coupled to the secondary windings, the secondary converter configured to provide a load power signal using the second multi-phase power signal; and
   wherein the secondary converter is configured to reduce current flow in the primary windings at or near a switch event of at least one of the first and second switches of the primary converter, the reduced current flow configured to reduce disturbances from leakage inductance of the transformer.

2. The apparatus of claim 1, wherein the first switch and the second switch are two-quadrant switches.

3. The apparatus of claim 1, wherein the secondary converter is configured to couple to a direct current (DC) device.

4. The apparatus of claim 3, wherein the primary converter is configured to receive a three-phase power signal; and the transformer is a three-phase transformer.

5. A method comprising:

receiving a first alternating current (AC) power signal having a first frequency at multiple first and second primary windings of a transformer;

selectively coupling together the first primary windings of the transformer to provide a second AC power signal having a second frequency using a first switch of a primary converter, wherein the second frequency is substantially higher than the first frequency;

selectively coupling together the second primary windings of the transformer to provide the second AC power signal using a second switch of the primary converter;

receiving the second AC power signal from a secondary winding of the transformer; and modulating the second AC power signal using a secondary converter to generate an output power signal having third frequency.

6. The method of claim 5, wherein receiving the first AC power signal includes receiving a first three-phase AC power signal.

7. The method of claim 5, wherein receiving the second AC power signal includes receiving a second three-phase AC power signal from the secondary winding of the transformer.

8. The method of claim 5, wherein modulating the second AC power signal includes controlling the second converter to generate an average output power signal having a third frequency equal to substantially zero hertz.

9. The method of claim 5, wherein modulating the second AC power signal includes pulse width modulating the secondary power signal with a symmetric pulse.

10. The method of claim 5, wherein modulating the second AC power signal includes pulse width modulating the secondary power signal to provide a unity power factor at the primary converter.

11. A system comprising:

a power grid;

a high frequency link coupled to the power grid, wherein the high frequency link includes:

a transformer having primary windings and secondary windings, the primary windings of the transformer configured to receive a first multi-phase power signal having a first frequency, wherein the primary windings include, for each phase of the multi-phase power signal, a first primary winding and a second primary winding magnetically coupled in direct phase opposition to the first primary winding;

a primary converter configured to generate a second multi-phase power signal having a second frequency at the secondary windings, the second frequency substantially higher than the first frequency, wherein the primary converter includes:

a first switch configured to couple together the first primary windings of each phase; and a second switch configured to couple together the second primary windings of each phase;

a secondary converter coupled to the secondary windings, the secondary converter configured to provide a load power signal using the second multi-phase power signal; and wherein the secondary converter is configured to reduce current flow in the primary windings at or near a switch event of at least one of the first and second switches of the primary converter, the reduced current flow configured to reduce disturbances from leakage inductance of the transformer;

an electronic device coupled to the high frequency link, wherein the electronic device is at least one of a wind generator, a hybrid vehicle, a photovoltaic cell, or an energy storage device; and wherein the high frequency link is configured to bi-directionally exchange energy between the power grid and the electronic device.

* * * * *

UNITED STATES PATENT AND TRADEMARK OFFICE
CERTIFICATE OF CORRECTION

| | | |
|---|---|---|
| PATENT NO. | : 8,446,743 B2 | Page 1 of 3 |
| APPLICATION NO. | : 12/834437 | |
| DATED | : May 21, 2013 | |
| INVENTOR(S) | : Gupta et al. | |

It is certified that error appears in the above-identified patent and that said Letters Patent is hereby corrected as shown below:

On the Title Page, in column 2, Item (57), Abstract, line 8, after "frequency", delete "substantially", therefor In the Drawings On sheet 9 of 12, Fig. 9, Reference Numeral 902, delete "S1" and insert --$S_1$--, therefor On sheet 9 of 12, Fig. 9, Reference Numeral 903, delete "S2" and insert --$S_2$--, therefor On sheet 10 of 12, Fig. 10, Reference Numeral 1002, delete "S1" and insert --$S_1$--, therefor On sheet 10 of 12, Fig. 10, Reference Numeral 1002, delete "S2" and insert --$S_2$--, therefor In the Specification In column 2, line 35, after "shows", insert --a--, therefor In column 2, line 52, delete "S1" and insert --$S_1$--, therefor In column 2, line 54, delete "S2" and insert --$S_2$--, therefor In column 3, line 51, after "on", delete "the", therefor In column 4, line 1, delete "S1" and insert --$S_1$--, therefor In column 4, line 67, delete "S1" and insert --$S_1$--, therefor Signed and Sealed this
Second Day of December, 2014

Michelle K. Lee
*Deputy Director of the United States Patent and Trademark Office*

CERTIFICATE OF CORRECTION (continued)
U.S. Pat. No. 8,446,743 B2

In column 4, line 67, delete "S2" and insert --$S_2$--, therefor

In column 6, line 52, delete "$p_{v1}$" and insert --$pv_1$--, therefor

In column 6, line 52, delete "$p_{v2}$" and insert --$pv_2$--, therefor

In column 6, line 55, delete "$p_{v1}$" and insert --$pv_1$--, therefor

In column 6, line 55, delete "$p_{v2}$" and insert --$pv_2$--, therefor

In column 7, line 64, delete "t1" and insert --$t_1$--, therefor

In column 7, line 64, delete "t2" and insert --$t_2$--, therefor

In column 8, line 45, delete "Vdc" and insert --$V_{dc}$--, therefor

In column 8, line 50, delete "ac-dc" and insert --AC-DC--, therefor

In column 8, line 51, delete "dc-dc" and insert --DC-DC--, therefor

In column 9, line 31, after "δ", delete "V^a" and insert -- $\hat{V}_a$ --, therefor In column 9, line 35, after "follows", delete "then", therefor In column 9, line 46, delete "Va" and insert --$V_a$--, therefor In column 10, line 65, delete "S1" and insert --$S_1$--, therefor In column 10, line 65, delete "S2" and insert --$S_2$--, therefor In column 11, line 14, delete "S1" and insert --$S_1$--, therefor In column 11, line 14, delete "S2" and insert --$S_2$--, therefor In column 11, line 15, delete "S1" and insert --$S_1$--, therefor In column 11, line 22, delete "S2" and insert --$S_2$--, therefor In column 11, line 27, delete "S1" and insert --$S_1$--, therefor In column 11, line 27, delete "S2" and insert --$S_2$--, therefor In column 11, line 37, delete "An" and insert --A--, therefor In column 11, line 52, delete "$\vec{V}_o = V_{dc} + V_{dc}e^{j2\pi/3}.$" and insert -- $\vec{V}_o = V_{dc} + V_{dc}e^{j2\pi/3}$ --, therefor In column 12, line 3, delete "S1" and insert --$S_1$--, therefor In column 12, line 3, delete "S1" and insert --$S_1$--, therefor In column 12, line 23, delete "S1" and insert --$S_1$--, therefor In column 12, line 24, delete "S1" and insert --$S_1$--, therefor In column 12, line 25, delete "S2" and insert --$S_2$--, therefor In column 12, line 26, delete "S1" and insert --$S_1$--, therefor In column 12, line 26, delete "Vs" and insert --$V_S$--, therefor In column 12, line 29, delete "S1" and insert --$S_1$--, therefor In column 12, line 31, delete "V1" and insert --$V_1$--, therefor In column 12, line 32, delete "V2" and insert --$V_2$--, therefor In column 12, line 33, delete "V2" and insert --$V_2$--, therefor In column 12, line 33, delete "d2" and insert --$d_2$--, therefor In column 12, line 36, delete "S1" and insert --$S_1$--, therefor In column 12, line 36, delete "S2" and insert --$S_2$--, therefor In column 13, line 22, delete "back" and insert --pack--, therefor In the Claims In column 15, line 18, in claim 5, after "having", insert --a--, therefor